United States Patent [19]

Yamada et al.

[11] Patent Number: 5,731,111
[45] Date of Patent: Mar. 24, 1998

[54] COLOR FILTER AND METHOD FOR MANUFACTURING THE SAME

[75] Inventors: Nobuaki Yamada, Higashiosaka; Shuichi Kozaki, Nara; Tsuyoshi Nakano, Funabashi; Reiko Sasaki, Yachiyo; Yoshikatsu Okada, Chiba, all of Japan

[73] Assignees: Sharp Kabushiki Kaisha; Sumitomo Chemical Company, Ltd., both of Osaka, Japan

[21] Appl. No.: 823,871

[22] Filed: Mar. 25, 1997

[30] Foreign Application Priority Data

Mar. 26, 1996 [JP] Japan ................... 8-070787

[51] Int. Cl.⁶ .................... G02B 5/20; G02F 1/1335
[52] U.S. Cl. .................... 430/7; 349/106; 205/122
[58] Field of Search ................ 430/7; 349/106; 205/122

[56] References Cited

U.S. PATENT DOCUMENTS

| | | | |
|---|---|---|---|
| 4,684,218 | 8/1987 | Aizawa et al. | 349/106 |
| 5,122,891 | 6/1992 | Kim | 349/106 |
| 5,473,450 | 12/1995 | Yamada et al. | 359/51 |
| 5,552,911 | 9/1996 | Okada et al. | 349/106 |
| 5,554,466 | 9/1996 | Matsushima et al. | 430/7 |

FOREIGN PATENT DOCUMENTS

| | | |
|---|---|---|
| 61-272720 | 12/1986 | Japan . |
| 62-247331 | 10/1987 | Japan . |
| 6-301015 | 10/1994 | Japan . |
| 7-120728 | 5/1995 | Japan . |

*Primary Examiner*—John A. McPherson
*Attorney, Agent, or Firm*—David G. Conlin; George W. Neuner

[57] ABSTRACT

A color filter of the present invention includes: a conductive layer having low conductivity regions; and a plurality of colored regions included in a colored layer on the conductive layer, wherein each of the colored regions has a concave portion at a position corresponding to each of the low conductivity regions.

9 Claims, 5 Drawing Sheets

No dislocation of axis

FIG.3B

Presence of dislocation of axis

FIG. 4A

Inclination of cell (Low → High)

No dislocation of axis

FIG. 4B

Presence of dislocation of axis

FIG. 6

COLOR FILTER AND METHOD FOR MANUFACTURING THE SAME

BACKGROUND OF THE INVENTION

1. Field of the Invention

The present invention relates to a color filter and a method for manufacturing the same. More particularly, the present invention relates to a color filter allowing an orientation axis for axisymmetrical orientation of liquid crystal molecules to be precisely and easily located at a desired position, and therefore capable of stably providing a wide viewing angle display mode liquid crystal display device having excellent display quality.

2. Description of the Related Art

A liquid crystal display (hereinafter, referred to as LCD) device taking advantage of electro-optic effect has been conventionally used. For example, a twisted nematic (TN) mode LCD device or a super twisted nematic (STN) mode LCD device utilizing nematic liquid crystal as a display medium has been put to practical use. These LCD devices require a polarizing plate and an alignment treatment to be performed for alignment films which are provided on at least one of the substrates so as to be in contact with a liquid crystal layer.

Figure 5A:
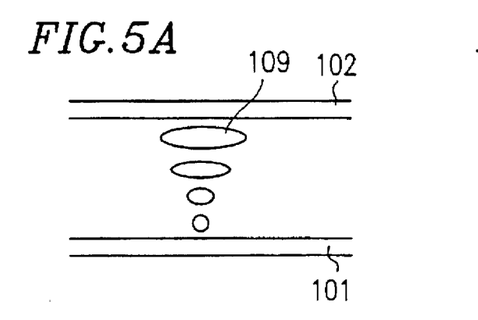
Figures 5B, 5E:
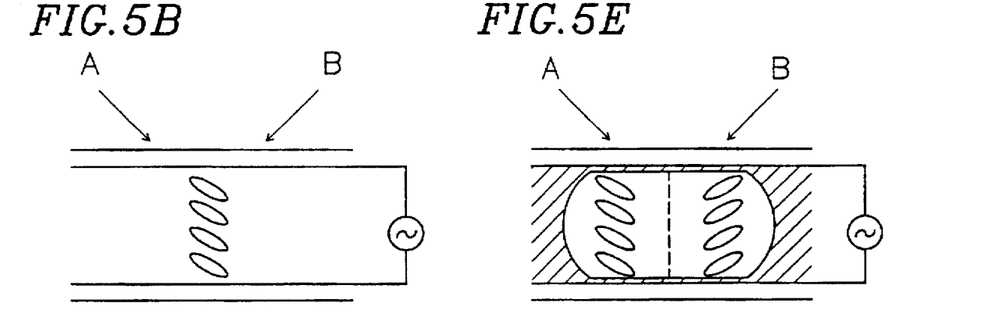
Figures 5C, 5F:
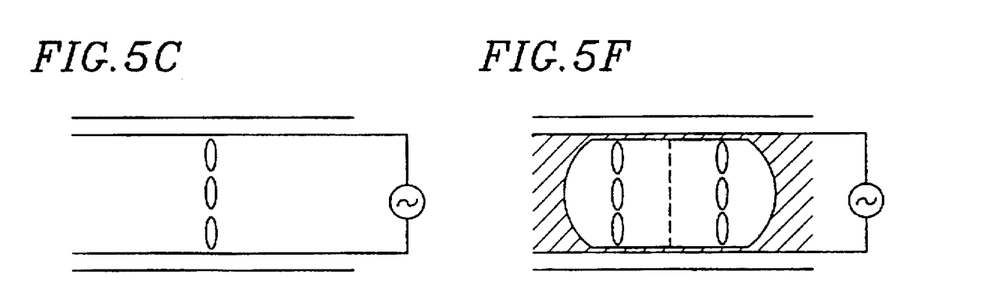

Problems with such conventional LCD devices will be described with reference to FIGS. 5A to 5C. FIGS. 5A to 5C are schematic cross-sectional views, each showing an orientation state of liquid crystal molecules in a conventional TN mode LCD device. FIG. 5A shows the state where no voltage is applied across a liquid crystal layer, FIG. 5B shows the state where a voltage is applied across a liquid crystal layer for grey-scale display, and FIG. 5C shows the state where a saturation voltage is applied across a liquid crystal layer. As shown in FIG. 5A, liquid crystal molecules 109 in a liquid crystal layer sandwiched between a pair of substrates 101 and 102 have a pretilt angle in an initial orientational state where no voltage is applied. When a voltage is applied across the liquid crystal layer, the liquid crystal molecules 109 orient to in the same angle as shown in FIGS. 5B and 5C. Therefore, when a viewer looks at the LCD device from a direction A and a direction B as shown in FIG. 5B, the display contrast greatly varies due to different apparent refractive indices. Furthermore, since the arising angle of the liquid crystal molecules 109 does not vary in accordance with the application of a voltage in a grey-scale display state, the liquid crystal molecules 109 are likely to align inversely to the application of a voltage. As a result, a contrast inversion phenomenon where a transmittance change is inverted occurs depending upon the viewing angle, thereby significantly deteriorating display quality.

Figure 5D:
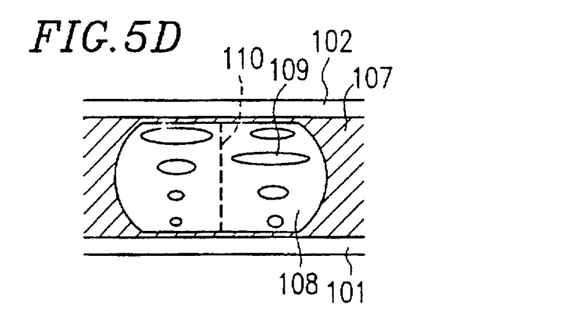

In order to solve such a problem, the applicants of the present invention have proposed a so-called wide viewing angle display mode LCD device as shown in FIGS. 5D to 5F (Japanese Laid-Open Patent Publication Nos. 6-301015 and 7-120728). The mechanism of improving viewing angle characteristics via a wide viewing angle display mode LCD device will be described with reference to FIGS. 5D to 5F. FIGS. 5D to 5F are schematic cross-sectional views, each showing the orientation of the liquid crystal molecules 109 in a wide viewing angle display mode LCD device. FIG. 5D shows the state where no voltage is applied across a liquid crystal layer, FIG. 5E shows the state where a voltage is applied across a liquid crystal layer for grey-scale display, and FIG. 5F shows the state where a saturation voltage is applied across a liquid crystal layer.

In a wide viewing angle display mode LCD device, as shown in FIG. 5D, a liquid crystal region 108 surrounded by a polymer wall 107 is formed between the pair of substrates 101 and 102. Then, the liquid crystal molecules 109 within the liquid crystal region 108 are axisymmetrically aligned about an axis 110, thereby providing wide viewing angle characteristics. More specifically, the liquid crystal molecules 109 within the liquid crystal region 108 are axisymmetrically aligned in this wide viewing angle mode LCD device. Therefore, when a voltage is applied as shown in FIGS. 5E and 5F, apparent refractive indices of the liquid crystal molecules 109 become identical with each other when viewed from the direction A and the direction B. As a result, viewing angle characteristics in a gray-scale display state are improved.

Figure 6:
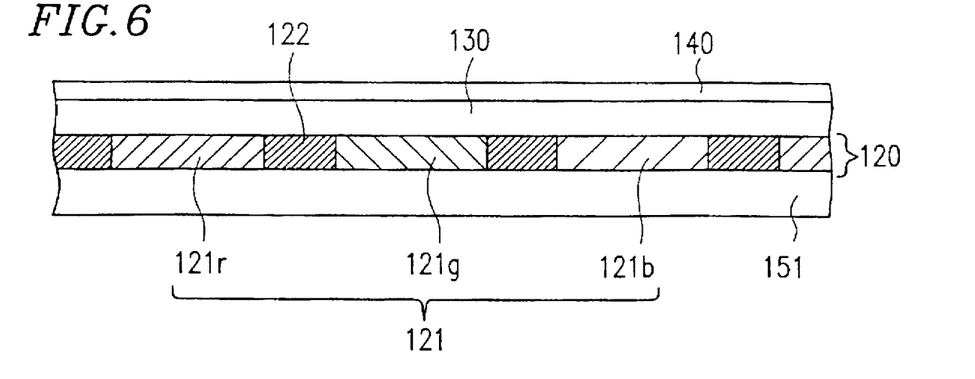
FIG. 6 is a schematic cross-sectional view showing a conventional color filter.

In the case where color display is performed, a color filter is incorporated into an LCD device. FIG. 6 is a schematic cross-sectional view showing a color filter 120 to be incorporated into an LCD device. As shown in FIG. 6, the color filter 120 is formed on one substrate 151 of the pair of substrates interposing a display medium of the LCD device therebetween. The color filter 120 includes a colored layer 121 and a black matrix 122. The colored layer 121 includes a plurality of colored regions of three primary colors, that is, a red (R) colored region 121r, a green (G) colored region 121g, and a blue (B) colored region 121b provided in a predetermined arrangement. Optionally, an overcoat layer 130 and a transparent electrode 140 for applying a voltage across a liquid crystal layer are formed on the colored layer 121 and the black matrix 122.

The overcoat layer 130 is provided so as to flatten the surface of the color filter 120. If the surface of the color filter 120 is uneven, the uneven surface of the color filter 120 induces an orientation defect of the liquid crystal molecules in a currently utilized display mode (e.g., TN mode) LCD device in which the color filter 120 is incorporated.

However, if the surface of the color filter 120 is flattened, the wide viewing angle display mode LCD device cannot be stably obtained. More specifically, in the case where a color filter 120 having a flat surface is utilized, it is difficult to accurately place the orientation axis for the axisymmetrical orientation of liquid crystal molecules at a predetermined position (for example, in the center of the liquid crystal region). As a result, there may arise a problem such as roughness of display due to a dislocation of the axis.

Thus, in light of the above, there is a strong need in the art for a color filter which allows the orientation axis for the axisymmetrical orientation of liquid crystal molecules to be precisely and easily located at a predetermined position and therefore capable of stably providing a wide viewing angle display mode LCD device having excellent display quality, and a simple method for manufacturing the same.

SUMMARY OF THE INVENTION

A color filter of the present invention includes: a conductive layer having low conductivity regions; and a plurality of colored regions included in a colored layer formed on the conductive layer, wherein each of the colored regions has a concave portion at a position corresponding to each of the low conductivity regions.

In one embodiment of the invention, each of the low conductivity regions is formed by utilizing a pore provided in the conductive layer.

In another embodiment of the invention, each of the low conductivity regions is formed by utilizing a pore provided so as to propagate through the conductive layer, thereby creating an insulation port.

In still another embodiment of the invention, each of the low conductivity regions is formed by utilizing a pore having a bottom face provided in the conductive layer, and a thickness of the low conductivity region is smaller than that of a peripheral region thereof.

In still another embodiment of the invention, the color filter includes an overcoat layer on the colored layer.

In still another embodiment of the invention, the color filter includes a transparent electrode on the colored layer.

In still another embodiment of the invention, the color filter includes a transparent electrode on the overcoat layer.

In still another embodiment of the invention, each of the low conductivity regions is provided almost in the center of each of the plurality of colored regions.

According to another aspect of the invention, a method for manufacturing a color filter including a conductive layer on a substrate and a plurality of colored regions included in a colored layer on the conductive layer, is provided. The method includes the steps of: providing low conductivity regions in a portion of the conductive layer, on which each of the colored regions is to be formed; and performing electrodeposition for the substrate so as to form the colored layer including the colored regions, each having a concave portion at a position corresponding to each of the low conductivity regions.

Thus, the invention described herein makes possible the advantages of: (1) providing a color filter which includes a colored layer having a concave portion at a desired position and allows an orientation axis for axisymmetrical orientation of liquid crystal molecules to be accurately and easily placed at a desired position in a liquid crystal display device; (2) providing a color filter capable of stably providing a wide viewing angle display mode liquid crystal display device having excellent display quality; and (3) providing a simple method for manufacturing such a color filter.

These and other advantages of the present invention will become apparent to those skilled in the art upon reading and understanding the following detailed description with reference to the accompanying figures.

BRIEF DESCRIPTION OF THE DRAWINGS

FIGS. 3A and 3B are schematic views showing the results of observing a liquid crystal display device from a normal direction under parallel Nicols through a polarizing microscope: FIG. 3A shows the state where the axis is not dislocated; and FIG. 3B shows the state where the axis is dislocated.

FIG. 4A shows the state where the axis is not dislocated; and FIG. 4B shows the state where the axis is dislocated.

FIGS. 5A to 5F are schematic views showing viewing angle characteristics of a TN mode liquid crystal display device and those of a wide viewing angle display mode liquid crystal display device in comparison; FIGS. 5A to 5C are schematic cross-sectional views showing the orientation of liquid crystal molecules in the TN mode liquid crystal display device; and FIGS. 5D to 5F are schematic cross-sectional views showing the orientation of liquid crystal molecules in a conventional wide viewing angle display mode liquid crystal display device.

DESCRIPTION OF THE PREFERRED EMBODIMENTS

Figure 1C:
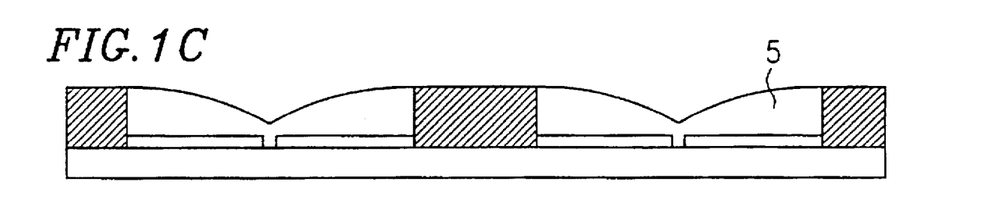
Figure 2:
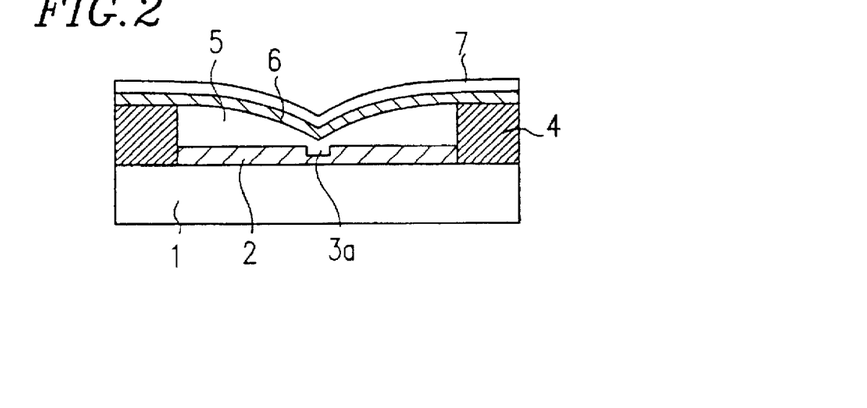
FIG. 2 is a schematic cross-sectional view showing another exemplary color filter according to the present invention.

In the present specification, the term "a concave portion formed on a colored layer" refers to an arbitrary concave portion formed on each colored region included in the colored layer, which has a recessed shape. The central portion of each colored region or the vicinity thereof serves as a lowermost portion and is capable of stably orientating liquid crystal molecules in an axisymmetrical manner and maintaining such an orientational state. Specific examples of such a concave portion include, a bowl shape, a reverse conical shape, and a shape obtained by rotating a parabola (i.e., a shape having U-shaped cross-section) or a shape obtained by rotating a square root curve (i.e., a shape having a cross-section as shown in FIGS. 1C and 2).

The term "axisymmetrical orientation of liquid crystal molecules" refers to an orientation state where a longitudinal axis of liquid crystal molecules are aligned in an axisymmetrical manner (e.g., in a radial manner, a concentric manner, or a spiral manner).

A concave portion of a colored layer can be formed by electrodeposition. The electrodeposition is conducted using a substrate including a conductive layer as one of a pair of electrodes. A low conductivity region is provided at a predetermined position of a region of the conductive layer where the colored layer is to be formed. More specifically, the concave portion on the colored layer is formed by the following procedure: (1) a low conductivity region is formed at a predetermined position (e.g., at a position corresponding to the vicinity of a central portion of each colored region) of the conductive layer; and (2) electrodeposition is conducted using a substrate including a conductive layer having a low conductivity region formed therein as one of a pair of electrodes. If the colored layer is formed in such a procedure, the colored layer is hardly formed in a region corresponding to a low conductivity region. As a result, the colored layer having a lowermost portion at the position corresponding to the low conductivity region can be formed.

Hereinafter, a preferred embodiment of a color filter according to the present invention and a fabrication process thereof will be described in detail with reference to FIGS. 1A to 1E.

Figure 1A:
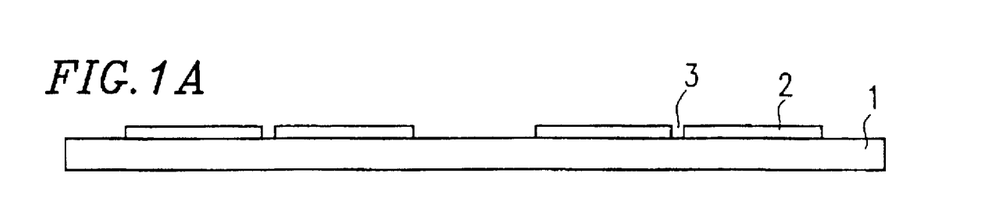
FIGS. 1A to 1E are schematic cross-sectional views showing a process of manufacturing a preferred exemplary color filter according to the present invention.

FIG. 1A is a schematic cross-sectional view showing a substrate 1 on which conductive layer 2 serving as transparent electrode is formed.

As the substrate 1, a transparent substrate such as a glass substrate or a plastic substrate can be used. Although not particularly specified, a thickness of the substrate 1 is usually about 1.1 mm or less, preferably about 0.7 mm. This thickness is preferable for forming a micropattern of resist in the subsequent steps. It is preferred that the substrate 1 be as flat as possible so that the micropattern can be easily formed.

A conductive film such as an ITO film (an indium oxide film doped with tin) or a NESA film (a tin oxide film doped with antimony) is formed over the entire surface of the substrate 1. Next, the conductive film is formed into a conductive layer (transparent electrode) 2 having a desired pattern electrically isolated from each other by photolithography or the like. In this case, the conductive layer 2 formed over the entire surface the substrate 1 can be optionally formed into a plurality of transparent conductive circuits having a desired shape by photolithography or the like.

Although a resistivity of the conductive layer 2 is not specifically limited, a lower resistivity is preferred. A resistivity is preferably 30 Ω/☐ or less, more preferably 20 Ω/☐ or less, and most preferably 15 Ω/☐ or less. When the resistivity is within such a range, a film thickness distribution and smoothness of an electrodeposition film (colored layer) to be subsequently formed can be improved. A resistivity distribution within the substrate is preferably uniform. When the resistivity and the resistivity distribution satisfy the above conditions, the substrate is not principally limited in size. Therefore, a color filter can be formed on an extremely large substrate so as to have a large size correspondingly. As a result, the requirements for enlargement of a screen of an LCD can be satisfied. Moreover, the industrial producibility of the color filter can be improved. This is one of the advantages of the present invention employing electrodeposition.

Next, as shown in FIG. 1A, low conductivity regions 3 (i.e., pores 3 propagating through the conductive layer 2) are formed through the conductive layer 2 for electrodeposition.

As a shape of the low conductivity region, a pore 3 having, for example, a square, circular or elliptical planar shape is preferred. The pore 3 may be formed so as to propagate through the conductive layer 2. Alternatively, a pore 3a which does not reach the substrate 1 (that is, having a bottom face) as shown in FIG. 2 may also be utilized. The pore 3a which does not propagate through the conductive layer 2 is preferable because a low conductivity region having a desired resistivity can be formed by adjusting the thickness of the remaining conductive layer 2 below the pore 3a. For example, by reducing the thickness of the conductive layer 2 located below the pore 3a, resistivity can be increased. In the case where the pore 3 propagates through the conductive layer 2, an insulating portion can be created in the low conductivity region. The size of the planar shape of the pore is appropriately determined in accordance with the size of the colored layer, the thickness of the conductive layer 2, and whether the pore propagates through the conductive layer 2 or not. In the case where the pore 3 propagating through the conductive layer 2 is utilized, the maximum width is normally in the range of about 5 μm to about 30 μm. It is apparent that a depth of the pore 3 propagating through the conductive layer 2 corresponds to the thickness of the conductive layers 2. In the case where the pore 3a does not propagate through the conductive layer 2, the thickness of the remaining conductive layer below the pore 3a is preferably in the range of about 1 Å to about 500 Å. When the thickness is within this range, the amount of electrodeposition can be definitely discriminated between a high conductivity region and a low conductivity region.

Although the cross-sectional shape of the low conductivity region (e.g., the pore 3) is not specifically limited, it is preferable that the width of the upper side of the low conductivity region and that of the bottom side thereof are identical with each other or the width of the bottom side is slightly smaller than that of the upper side.

Although the position where the low conductivity region is to be provided is not specifically limited, it is preferred that the low conductivity region be provided almost in the center of the region where the colored region of the colored layer is to be formed. With this arrangement, the colored region having a concave portion of a desired shape can be formed, thereby providing desired axisymmetrical orientation of the liquid crystal molecules. In other words, since the orientation axis of the axisymmetrical orientation of the liquid crystal molecules is fixed in the low conductivity region, excellent axisymmetrical orientation of the liquid crystal molecules can be easily realized by providing a low conductivity region in the center of the colored region of the colored layer.

A low conductivity region can be formed by dry etching such as laser etching or sputtering or wet etching using an etchant containing a chemical compound. In view of the producibility and the cost, it is preferred to employ wet etching. The etchant used for wet etching is not specifically limited and any known suitable etchant can be used. In the case where the low conductivity region is formed by dry etching utilizing a laser or the like, it is possible to directly form the low conductivity region at a predetermined position in a mechanical manner. Normally, however, the low conductivity region is formed at a predetermined position by well-known photolithography. In the case where the conductive layer is formed into a circuit form by photolithography, it is industrially advantageous to provide the low conductivity region simultaneously with the circuit formation.

The low conductivity region in the conductive layer 2 may also be formed after forming a light-shielding layer described below.

Figure 1B:
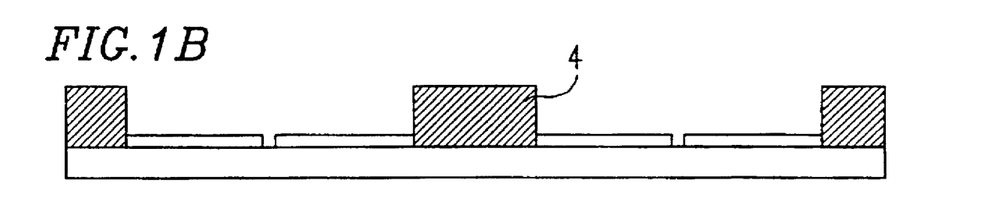

Next, as shown in FIG. 1B, a black matrix (light-shielding layer) 4 is formed. The black matrix 4 is formed through the window formation step, the exposure step, the development step and the thermal treatment step after a light-shielding film is applied onto the entire surface of the substrate 1 including the conductive layer 2 by a conventional film formation method such as screen printing, spin coating or roll coating.

A thickness of the light-shielding film to be formed can be adjusted so that the light-shielding layer 4 has a predetermined thickness. Although the thickness of the light-shielding layer 4 can vary in accordance with the type of LCD into which the color filter is incorporated, the thickness of the light-shielding layer is normally in the range of about 0.2 μm to 5 μm. Therefore, the thickness of the light-shielding film to be applied is preferably in the range of about 0.8 μm to about 3 μm in view of the light-shielding property, the patterning property and the thickness of the colored layer.

As a material forming the light-shielding layer, a dispersion containing a photo-sensitive material having a heat resistance and a solvent resistance (e.g., an acrylic resin, a polyester resin, a polyimide resin) and a light-shielding pigment (e.g., carbon black and titanium black) can be used. In the present invention, however, the material forming the light-shielding layer is not limited to a specific material. Any known material can be used as long as the material has suitable light-shielding ability and satisfies the specific properties required for the color filter. For example, a commercially available photosensitive resin containing a black material (e.g., CFPR-BK550S, manufactured by Fuji-Hunt Electronics Technology Co., Ltd.; V259-BKO, manufactured by Nippon Steel Chemical Co., Ltd.) can be used. A metal or a metal oxide (e.g., Mo, Ni, Al and chromium oxide) can also be used as a material forming the light-shielding layer.

Next, a window is formed through the resultant light-shielding film. In this step, the light-shielding film is patterned into a desired pattern so as to form a portion through which the transparent conductive layer is exposed (that is, a so-called window portion). The pattern of the window portion is determined in accordance with a LCD screen using the color filter. For example, in a small screen such as about 5 inches or less, a delta arrangement, a mosaic arrangement or the like is employed. In the larger screen, a stripe arrangement is mainly used. It is preferred that the light-shielding film be patterned so that each of the low conductivity regions 3 provided on the conductive layer 2 is located at approximately the center of each window portion.

The light-shielding film is prebaked for drying as needed. By conducting the prebaking, the light-shielding film is preliminary cured to improve the adhesion between the light-shielding film (that is, the light-shielding layer 4) and the substrate. As a heating temperature and a heating time period for the prebaking, appropriate conditions known in the art (e.g., 60°–90° C., 3–15 minutes or 130° C., 30 minutes by using a baking-plate or the like) are employed.

Next, light exposure is conducted. In this step, the light-shielding film is exposed to light through a photomask (not shown) having a light-transmitting portion having a pattern corresponding to the predetermined pattern to be formed through the light-shielding film.

As light to be radiated, a light beam having a wavelength in various ranges can be used in accordance with the type of the light-shielding film (that is, the photosensitive resin). In general, the light in the UV region is preferred. As a light source, an apparatus employing a high pressure mercury lamp or a metal halide lamp can be utilized. The exposure method is not particularly limited. Any known method such as a conveyor method, a proximity method, a mirror projection method and a stepper method can be employed. As to the producibility, a proximity method or a mirror projection method is preferred. The amount of light exposure can vary in accordance with properties of the light-shielding film, normally in the range of about 1 mJ/cm$^2$ to about 5000 mJ/cm$^2$.

Furthermore, thermal treatment is conducted for the light-shielding film exposed to light, as needed. This thermal treatment is referred to as post-exposure bake (PEB). The PEB is conducted so as to promote a light-induced reaction by heating, thereby completely curing (or decomposing) the light-exposed portion. As a heating temperature or a heating time period during the PEB, the conditions known in the art (e.g., 60°–90° C., 3–15 minutes using a baking-plate) are employed. These conditions may be changed depending on the kinds of materials for the light-shielding film and/or the substrate.

Next, development is performed. In this step, if the used photosensitive resin is a negative type, the unexposed portion is dissolved so as to be removed. If the used photosensitive resin is a positive type, the exposed portion is dissolved so as to be removed. The development is carried out by bringing the light-shielding film in contact with (e.g., immersing the film into) a chemical material (e.g., a developer) having solubility suitable for the photosensitive resin. As for the development conditions such as the type of developer and the developing time period, suitable conditions known in the art may be employed.

Finally, thermal treatment is conducted. This thermal treatment is referred to as post-baking. The post-baking is performed so as to fix a frame-shaped light-shielding layer resulting from the development, thereby improving adhesion with the substrate. Preferably, the post-baking is performed at a temperature higher than that of pre-baking or PEB. Although specific thermal treatment conditions can vary in accordance with the material, the post-baking is normally performed at a temperature in the range of about 110° C. to about 270° C. for about 5 minutes to about 180 minutes. If a thermal treatment temperature is too high, although the adhesion between the light-shielding layer and the substrate may be improved, the light-shielding material is likely to be deteriorated so as to be friable. Therefore, it is preferred that the post-baking is performed under appropriate conditions in accordance with the light-shielding material.

The black matrix (light-shielding layer) 4 can be formed by other known methods. For example, the light-shielding layer 4 can be formed by electrodeposition using a method described in Japanese Laid-Open Patent Publication No. 61-272720. Alternatively, the light-shielding layer 4 can be formed by the following manner. After the window-shaped colored layer is formed by a method described in Japanese Laid-Open Patent Publication No. 61-272720, the frame-shaped photosensitive resin coating film is removed. Then, a back exposure method described in Japanese Laid-Open Patent Publication No. 62-247331 is performed, thereby forming the light-shielding layer.

In this manner, the frame-shaped black matrix (light-shielding layer) 4 is formed on the substrate 1.

Next, as shown in FIG. 1C, the colored layer 5 including a red (R) colored region, a green (G) colored region and a blue (B) colored region is formed by electrodeposition. In this step, the substrate 1 including the resultant light-shielding layer 4 having a predetermined pattern and the conductive layer 2 exposed so as to have the predetermined pattern is used as one of a pair of electrodes. The electrodeposition is performed by immersing the substrate (that is, the electrode) 1 and a counter electrode (not shown) into an electrodeposition solution, and then applying a voltage across the electrodes.

The counter electrode is not specifically limited as long as it is made of a conductor which does not react with an electrodeposition solution. Stainless steel is taken as an exemplary material of the counter electrode. The shape of the counter electrode is not specifically limited. The shape of the counter electrode may be completely different from that of the substrate. Preferably, however, the counter electrode has the same or a similar shape as the substrate. The counter electrode may have a solid plate shape or a net shape. Preferably, the counter electrode has a net shape because the thickness distribution and smoothness of the electrodeposition film can be further improved.

The electrodeposition can be performed by a known method. Typical examples of the electrodeposition include anion type electrodeposition and cation type electrodeposition. Although both methods can be utilized in the present invention, the anion type electrode deposition is preferred because the effect on the electrodes formed on the substrate or the like is smaller than that of the cation type electrodeposition.

Normally, the electrodeposition solution can be prepared by dispersing, dissolving or diluting a component such as a resin material (a binder) and a colorant into an appropriate solvent. As a binder, resins such as a maleic oil type resin, an acrylic type resin, a polyester type resin, a polybutadiene type resin, and a polyolefine type resin can be used. A thermosetting resin or a photocurable resin can also be used as the binder. Each of these materials can be used alone or in combination. Normally, the binder can be used in the amount of 5 to 10 parts by weight for 100 parts by weight of a solvent. As a colorant, a dye or a pigment can be used. By mixing the colorant of a desired hue in the electrodeposition solution, a colored layer including colored regions of arbitrary colors, for example, red (R), green (G) or blue (B) can be formed. Normally, the colorant can be used in the amount of 1 to 5 parts by weight for 100 parts by weight of a solvent. As a solvent, water and an organic solvent (e.g., butyl cellosolve) can be utilized.

An electrodeposition solution tank is not particularly limited as long as it is made of an insulating material capable of holding an electrodeposition solution therein. For example, a plastic electrodeposition solution tank made of rigid vinyl chloride and an acrylic resin can be used.

The above-mentioned electrodeposition solution is put into such an electrodeposition solution tank. Then, the substrate 1 and the counter electrode are arranged in parallel in the electrodeposition solution so as to face each other. At this time, it is preferred that the substrate 1 and the counter electrode are disposed so that the center part of the substrate 1 corresponds to the center part of the counter electrode. For example, when the anion electrodeposition is performed, the conductive layer 2 of the substrate 1 serves as an anode and the counter electrode serves as a cathode. When DC voltage is applied across the anode and the cathode, the colored layer 5 is formed on the conductive layer.

The electrodeposition is normally performed under the conditions of a current in the range of about 10 to about 300 V and a voltage application time period of about 1 second to about three minutes. A thickness of the colored layer 5 to be formed can be controlled easily by appropriately selecting the electrodeposition conditions.

After forming the electrodeposition film (colored layer) 5, it is desirable to sufficiently wash the colored layer 5 to remove unnecessary materials there-from. In order to increase the strength of the electrodeposition film 5, a thermal treatment is performed at a temperature of about 100° C. to about 280° C. for about 10 minutes to about 120 minutes as needed.

If the electrodeposition is performed as described above, the electrodeposition film is hardly formed on the colored layer 5 corresponding to the low conductivity region 3 formed in the conductive layer 2. As a result, the colored layer 5 having concave portions at the positions corresponding to the low conductivity regions 3 of the conductive layer 2 can be formed.

Figure 1D:
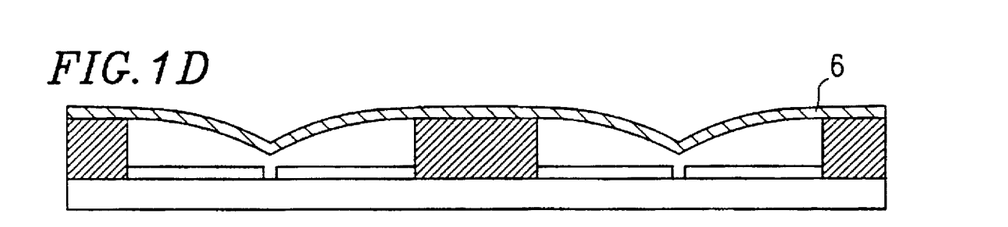
Figure 1E:
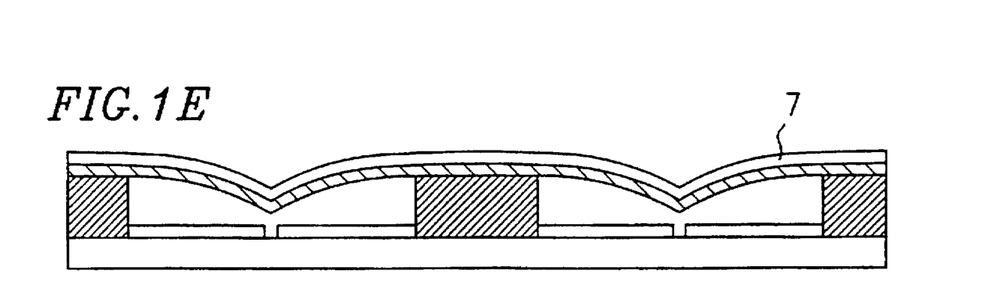

Next, as shown in FIG. 1D, an overcoat layer 6 is formed over the colored layer 5 and the black matrix 4. Furthermore, as shown in FIG. 1E, a transparent electrode 7 used as a counter electrode is formed on the overcoat layer 6. The overcoat layer 6 may be omitted, so that the transparent electrode 7 can be directly formed over the colored layer 5 and the black matrix 4. In this manner, a color filter of the present invention is completed.

As described above, according to the present invention, a color filter including the colored layer having a window-like planar shape and a frame-shaped light-shielding layer surrounding the colored layer (e.g., the color filter shown in FIG. 1E) can be advantageously formed (that is, at low cost in a simple manner).

Furthermore, the color filter of the present invention is useful when applied to a wide viewing angle display mode liquid crystal display device having a liquid crystal region of axisymmetrical orientation (i.e., a liquid crystal device including a display medium having a liquid crystal region and a polymer wall surrounding the liquid crystal region). Since the position of the orientation axis of axisymmetrical orientation of liquid crystal molecules can be accurately controlled, a wide viewing angle display mode LCD device having excellent display quality without roughness can be obtained. The details will be described below.

In the case where the axisymmetrical orientation of the liquid crystal molecules is created for each pixel, the shape of the surface of the substrate is an important factor. In particular, it is experientially known that the orientation axis is positioned at the portion where a cell gap (a distance between the substrates) in the pixel is the largest. Therefore, by locating the portion where the cell gap is the largest in the center part of the pixel, it becomes possible to locate the orientation axis in the center part of the pixel. According to the present invention, a low conductivity region is formed at a desired position (e.g., the center part) of the conductive layer formed on the substrate. Then, the electrodeposition is performed for such a substrate to form the colored layer. Since the electrodeposition hardly occurs in the colored layer portion corresponding to the low conductivity region, a concave portion can be easily formed at a desired position (the position corresponding to the low conductivity region) of the colored layer. Therefore, the color filter of the present invention can have the concave portion at a predetermined position (e.g., the position corresponding to the center part of the pixel) of the colored layer. By manufacturing the liquid crystal display device using such a color filter, it is possible to form the portion having the maximum cell gap at a desired position of the substrate.

In the case where the color filter of the present invention is incorporated into the liquid crystal display device, each colored region included in the colored layer of the color filter is provided so as to correspond to each pixel of the liquid crystal display device. Specifically, each colored region included in the colored layer of the color filter is disposed so as to correspond to a liquid crystal region of a display medium of the liquid crystal display device having a polymer wall and a liquid crystal region surrounded by the polymer wall. Therefore, for example, by using the color filter having a concave portion at the center part of the colored region of the colored layer, it is possible to easily and precisely locate the orientation axis for axisymmetrical orientation of the liquid crystal molecules in the center part of the liquid crystal region (that is, the center part of the pixel). As a result, since the liquid crystal molecules are axisymmetrically orientated in such a manner, a wide viewing angle display mode liquid crystal display device having excellent display quality without roughness can be obtained.

As described above, the color filter of the present invention has excellent advantages owing to the presence of a concave portion at a predetermined position of each colored region (that is, each pixel). The advantages of the present invention (e.g., the ability of controlling the position of the concave portion) can never be obtained with a conventional color filter having an objective of flattening the surface.

EXAMPLES

Hereinafter, the present invention will be described by way of illustrative examples. However, the present invention is not be limited to these examples.

Example 1

Pigments of red, green and blue were dispersed at respective predetermined concentration in anionic polyester resin type paint for electrodeposition (ESBIA ED-3000 clear, manufactured by Shinto Paint Co., Ltd.) by a known method so as to prepare red, green and blue electrodeposition solutions for electrodeposition, respectively.

Next, a conductive layer was formed on a surface of a glass substrate having a length of 350 mm, a width of 300 mm and a thickness of 1.1 mm. The conductive layer was patterned into a window-shape each having 70 μm square and 30 μm interval (that is, 100 μm pitch) using an ITO having a resistivity of 15 Ω/□. On the regions where the conductive layer was not formed, a frame-shaped black matrix (light-shielding layer) having a thickness of 2.0 μm was formed. Furthermore, a circular pore (low conductivity regions) having a diameter of 10 μm was formed almost in the center part of the window-shaped exposed conductive layer so as to propagate therethrough. The patterning of the conductive layer and the formation of the circular pore were performed by conventional photolithography using a photomask. The black matrix (light-shielding layer) was formed by patterning via conventional photolithography, baking and curing using a negative type resist in which a black pigment was dispersed (commercial name: V259-BKO, manufactured by Nippon Steel Chemical Co., Ltd.).

Next, the resultant glass substrate was placed within the electrodeposition solution along with the counter electrode, so that the electrodeposition was performed with red, green and blue electrodeposition solutions, respectively. The electrodeposition was performed at 30° C. at 50 V for 10 seconds. After the substrate was removed from the electrodeposition solution, the substrate was sufficiently washed with water. Then, the substrate was subjected to baking and curing at 260° C. for 60 minutes to form a colored layer having colored regions of three colors.

As shown in FIG. 1E, the colored regions of the colored layer were precisely formed only on the exposed conductive layer. The colored region had a satisfactory concave cross-sectional shape having the lowermost portion at the center thereof.

Comparative Example 1

A color filter was fabricated without providing a low conductivity region.

The color filter was fabricated in the same manner as Example 1 except that a photomask without a pattern for forming pores was utilized.

The thus fabricated color filter had a flat surface as shown in FIG. 6.

Comparative Example 2

A color filter was fabricated in the same manner as that in Example 1 while varying a diameter of the low conductivity region (i.e., circular pore formed so as to propagate through the conductive layer). When the diameter was more than 30 μm, the low conductivity regions were not sufficiently covered by the colored layer during electrodeposition. As a result, light disadvantageously passed therethrough, and a color purity was reduced. When the diameter was less than 5 μm, the effect for concaving the center part of the colored layer was insufficient.

Example 2

The low conductivity regions were formed by forming the pores so as not to propagate through the conductive layer.

The conductive layer was formed in the same manner as in Example 1 except that the conductive layer was formed by using a photomask having the same pattern as in Comparative Example 1. A resist hole (having a diameter of 30 μm) was formed by employing photolithography at the position corresponding to the center part of the pixel on the conductive layer. Then, the substrate was etched so that the thickness of the conductive layer was reduced to about ⅓. Thereafter, the same process as in Example 1 was performed, thereby manufacturing the color filter shown in FIG. 2.

Although the resultant color filter had a large diameter, i.e., 30 μm of the low conductivity region, a color purity was not reduced. The reason for this is considered that the low conductivity regions maintain conductivity without insulation.

Next, three kinds of liquid crystal display devices were fabricated by using the color filters of Examples 1, 2, and Comparative Example 1, respectively.

First, a TFT substrate to be provided so as to face the color filter substrate was fabricated by a conventional method. More specifically, pixel electrodes and thin film transistors (TFTs) serving as switching elements for driving the pixel electrodes were formed on a substrate. Then, a lattice-patterned resist wall was formed so as to surround each of the pixel electrodes by using a resist material.

Next, the TFT substrate and the color filter substrate were attached to each other. Then, a sealing material was provided for the peripheral region outside a display region between the substrates, thereby manufacturing a cell. Then, a mixture at least containing a liquid crystal material and a photocurable monomer was injected into the cell.

Next, an operation for axisymmetrically orientating liquid crystal molecules was performed by a known method so as to axisymmetrically orientate the liquid crystal molecules. Furthermore, a predetermined portion of the cell was selectively irradiated with light so as to cure the photocurable monomer, thereby stabilizing the axisymmetrical orientation of the liquid crystal molecules. In this manner, the liquid crystal display device including liquid crystal regions at the positions corresponding to the pixel electrodes and a polymer wall surrounding the liquid crystal regions was obtained. The polymer wall was formed in the irradiated portion, while the liquid crystal region was formed in the unirradiated portion.

Figure 3A:
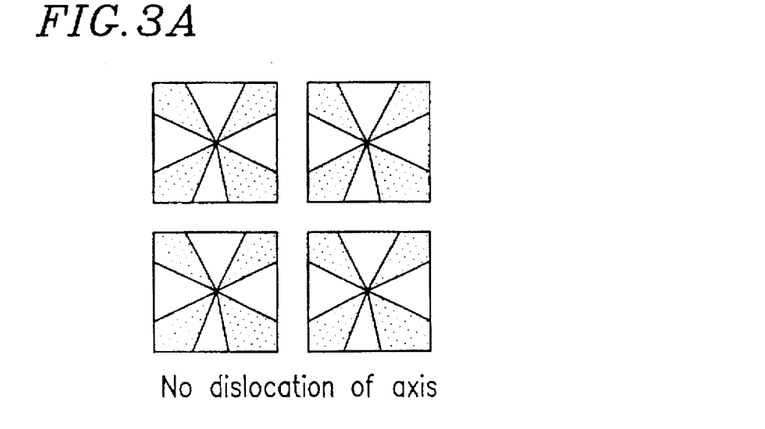
Figure 3B:
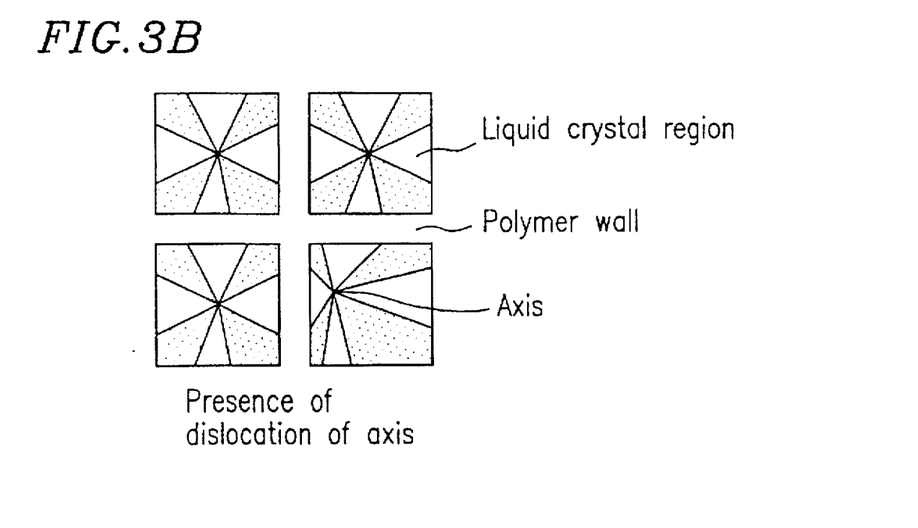
Figure 4A:
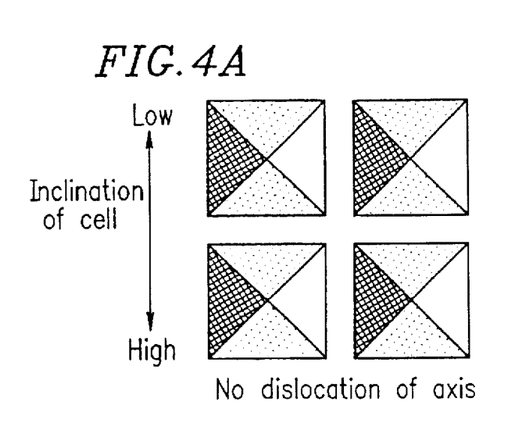
FIGS. 4A and 4B are schematic views showing the results of observing a liquid crystal display device in an inclined state under crossed Nicols through a polarizing microscope.
Figure 4B:
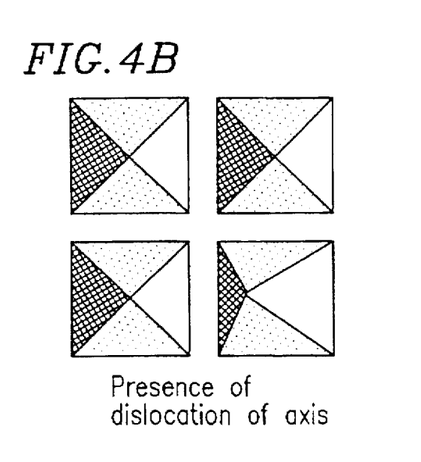

When the thus fabricated liquid crystal display device was observed through a polarizing microscope, the position of the orientation axis for axisymmetrical orientation of the liquid crystal molecules were precisely controlled for each compartment (i.e., each pixel) in the liquid crystal region in the liquid crystal display devices employing the color filter substrates fabricated according to Examples 1 and 2. On the other hand, in the liquid crystal display device using the color filter substrate according to Comparative Example 1, it was found that the orientation axes for axisymmetrical orientation were dislocated in a plurality of pixels. The result of observation will be described for the case where these liquid crystal display device are driven to perform a display. FIGS. 3A and 3B are schematic views showing the results of observing the liquid crystal display devices from a normal direction under parallel Nicols through a polarizing microscope. FIG. 3A shows the state where the axis is not dislocated, and FIG. 3B shows the state where the axis is dislocated. FIGS. 4A and 4B are schematic views showing the results of observing the liquid crystal display devices in an inclined state under crossed Nicols through a polarizing microscope. FIG. 4A shows the state where the axis is not dislocated, and FIG. 4B shows the state where the axis is dislocated. In the liquid crystal display devices employing the color filter substrates fabricated according to Examples 1 and 2, an excellent display without roughness can be obtained as shown in FIGS. 3A and 4A. On the other hand, in the liquid crystal display device employing the color filter substrate fabricated according to Comparative Example 1, a dark area and a bright area become uneven in FIGS. 3B and 4B. As a result, roughness of display is observed in a grey-scale display when viewed at an inclined viewing angle as shown in FIGS. 3B and 4B.

As described above, according to the present invention, the color filter having a concave portion at a predetermined position of the colored layer and capable of accurately and easily locating the orientation axis for axisymmetrical orientation of liquid crystal molecules at a desired position in a LCD device can be provided. In the liquid crystal display device employing the color filter according to the present invention, the liquid crystal molecules within each pixel can be well-orientated in an axisymmetrical manner while employing the center part of the pixel as a center of the orientation. Therefore, roughness of display which has been conventionally observed when varying the viewing angle can be reduced. A wide viewing angle display mode LCD device capable of performing a uniform display at a high contrast can be obtained.

Furthermore, according to the fabrication method of the present invention, simply by changing the pattern of a photomask, a color filter having a concave portion at a predetermined position can be manufactured by a manufacturing process utilizing electrodeposition for a conventional color filter. Specifically, a color filter having an accurately controlled surface shape, which is capable of stably providing a wide viewing angle display mode LCD device having excellent display quality, can be easily manufactured at low cost.

The liquid crystal display device utilizing the color filter according to the present invention can be suitably used for a portable data terminal to be viewed by a plurality of persons, or a flat panel display such as a personal computer, a word processor, amusement equipment and a television.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A color filter comprising:
   a conductive layer having low conductivity regions; and
   a plurality of colored regions included in a colored layer formed on the conductive layer,
   wherein each of the colored regions has a concave portion at a position corresponding to each of the low conductivity regions.

2. A color filter according to claim 1, wherein each of the low conductivity regions further comprises a pore provided in the conductive layer.

3. A color filter according to claim 1, wherein each of the low conductivity regions further comprises a pore provided so as to propagate through the conductive layer, thereby forming an insulation portion.

4. A color filter according to claim 1, wherein each of the low conductivity regions further comprises a pore having a bottom face provided in the conductive layer, and a thickness of the low conductivity region is smaller than that of a peripheral region thereof.

5. A color filter according to claim 1, further comprising an overcoat layer on the colored layer.

6. A color filter according to claim 5, further comprising a transparent electrode on the overcoat layer.

7. A color filter according to claim 1, further comprising a transparent electrode on the colored layer.

8. A color filter according to claim 1, wherein each of the low conductivity regions is provided approximately in the center of each of the plurality of colored regions.

9. A method for manufacturing a color filter including a conductive layer on a substrate and a plurality of colored regions included in a colored layer on the conductive layer, comprising the steps of:
   providing low conductivity regions in a portion of the conductive layer, on which each of the colored regions is to be formed; and
   performing electrodeposition for the substrate so as to form the colored layer including the colored regions, each having a concave portion at a position corresponding to each of the low conductivity regions.

* * * * *